United States Patent
Tolmer et al.

(10) Patent No.: US 7,428,711 B2
(45) Date of Patent: Sep. 23, 2008

(54) GLOW HIGHLIGHTING AS AN INK ATTRIBUTE

(75) Inventors: Justin Garrett Tolmer, Seattle, WA (US); Charlton E Lui, Vancouver (CA)

(73) Assignee: Microsoft Corporation, Redmond, WA (US)

( * ) Notice: Subject to any disclaimer, the term of this patent is extended or adjusted under 35 U.S.C. 154(b) by 781 days.

(21) Appl. No.: 10/284,378

(22) Filed: Oct. 31, 2002

(65) Prior Publication Data
US 2004/0085358 A1 May 6, 2004

(51) Int. Cl.
*G06F 3/00* (2006.01)
(52) U.S. Cl. .................... 715/863; 345/17; 345/592; 345/179
(58) Field of Classification Search ........... 715/863; 345/17, 179, 592
See application file for complete search history.

(56) References Cited

U.S. PATENT DOCUMENTS

| 5,410,331 | A | * | 4/1995 | Schuneman ............... 345/602 |
| 5,517,578 | A | * | 5/1996 | Altman et al. .............. 382/181 |
| 5,832,474 | A | * | 11/1998 | Lopresti et al. ............... 707/2 |
| 5,867,150 | A | * | 2/1999 | Bricklin et al. ............. 345/173 |
| 6,373,490 | B1 | * | 4/2002 | Bendiksen et al. .......... 345/441 |
| 2001/0053978 | A1 | * | 12/2001 | Lewis et al. ................ 704/275 |
| 2003/0179235 | A1 | * | 9/2003 | Saund et al. ................. 345/764 |

OTHER PUBLICATIONS

Adobe, "Adobe Photoshop 5.0 Classroom in a Book", 1998, pp. 1-4.*
Brown, Jinny, Text with a Multicolored Glow, 2001, http://www.pixelalley.com/tutorials/text-multicolored-glow.html, pp. 1-5.*
M. Götze et al., "The Intelligent Pen—Toward a Uniform Treatment of Electronic Documents," *Int. Symp. on Smart Graphics,* Jun. 11-13, 2002, pp. 129-135.
M. Price, et al., "Linking By Inking: Trailblazing in a Paper-like Hypertext," *HyperText 98,* Pittsburgh, PA, 1998, pp. 30-39.

* cited by examiner

*Primary Examiner*—Stephen Hong
*Assistant Examiner*—Ryan Pitaro
(74) *Attorney, Agent, or Firm*—Amin, Turocy & Calvin, LLP

(57) ABSTRACT

Methods for rendering electronic ink with highlighting attributes include: (a) receiving data representing at least one electronic ink stroke including a highlighting attribute; (b) rendering a first highlighting stroke in a first dimension and in a first highlighting color and/or pattern; and (c) rendering an ink color stroke in an ink color and/or pattern and in a second dimension that is smaller than the first dimension to produce a composite stroke that has a highlighted appearance. When the highlighted stroke is selected, this stroke may be rendered with a third, inner layer that is narrower than the ink colored layer, in a highlight color and/or pattern. This invention also relates to systems and computer-readable media for performing these methods, and to data structures that include a highlight attribute with electronic ink data.

29 Claims, 11 Drawing Sheets

This is normal ink.

FIG. 8a

This is ink with glow! —802
—804

FIG. 8b

This is ink with glow! —808
—810
806—

FIG. 8c

GLOW HIGHLIGHTING AS AN INK ATTRIBUTE

FIELD OF THE INVENTION

The present invention relates generally to graphical user interfaces. Specifically, aspects of the present invention relate to data structures, systems, methods, and computer-readable media for rendering and editing digital ink, for example, in a pen-based computing system, to include highlighting attributes. Further aspects of the present invention allow users to select and manipulate the highlighted graphical objects.

BACKGROUND OF THE INVENTION

A picture is worth a thousand words. This sentiment echoes throughout various aspects of our lives, and the world of computing is no exception. Since their inception, graphical user interfaces (GUIs) have become a standard and preferred way for millions of computer users to interact with their computers. Accordingly, increasing importance is being placed on the way in which computers visually display the user's actions and the environment in which the user may take these actions.

Typical GUIs use a number of onscreen graphical objects to visually represent functions, applications, files, menus, and a host of other features for the computing environment. The user typically uses a keyboard and/or a mouse input device to move an onscreen pointer to select a particular graphical object for action.

While this GUI has proven effective, a new step in the evolution of computing has revealed limitations in the traditional GUIs mentioned above. Specifically, the introduction of pen-based computing devices, such as the hand-held Personal Data Assistant (PDA) or the Tablet PC being introduced with an operating system produced by Microsoft Corp., has dramatically changed the way we view the GUI and the manner in which users can interact with their computers.

As one example, people very commonly use computers and GUIs to generate and edit electronic documents. These electronic documents may contain text (e.g., electronic word processors) and/or images (e.g., pictures) that are displayed on the user's screen and are available for editing and/or printing. To interact with these onscreen objects, the user typically uses a mouse input device to move an onscreen pointer to the desired object, and presses a button on the mouse and drags it to select the object (a "click-and-drag" action).

The selection of a particular object may be reflected in the GUI by a change in its appearance. For example, electronic word processing programs, such as the Microsoft WORD® word processing program, may display text as shown in FIG. 1a.

In FIG. 1a, the text "Sample Text" appears in black on a white background. The text is arranged automatically in uniform rows of text across the user's screen, where the rows of text are assigned a predefined height based on user-defined settings (e.g., the use of 10 point font, the line spacing, etc.). Upon selecting these words, for example, using a click-and-drag motion of the mouse pointer over the words, their appearance may change to that shown in FIG. 1b. In this figure, the actual selected text is now rendered in white, and the rectangular area inhabited by the text in the row is rendered in a black background that serves to distinguish the blocked selection, and to thereby visually identify the selected text to the user. The black blocked selection occupies the entire row height and serves to differentiate the selected text (top row) from the non-selected text (bottom row).

Microsoft's WORD® word processing program also allows users to apply highlight to text in a manner similar to the text selection feature shown in FIG. 1b. Using this feature, a block of text may be highlighted with a highlight color (e.g., black text on a yellow, pink, or green background, etc.) using a click-and-drag action. Different colors are used when highlighted text is selected (e.g., white text on a blue background, etc.) as compared to selection of non-highlighted text (e.g., white text on a black background, etc.). The highlighted text appears similar to the selected text shown in FIG. 1b, except the background block is in a highlighter color (not black).

Although this prior art approach to selecting and/or highlighting text works well in the uniform, line-by-line environment of traditional word processors, this approach is less effective in other environments that allow a greater degree of freedom, such as in pen-based computing devices, where text or other information is not confined to standard horizontal lines of regular size. For example, in systems where the text is handwritten (e.g., on a personal data assistant using a touch-sensitive screen or on other pen-based computing systems), a user may be permitted to write text (in electronic ink) anywhere on a page, in any orientation. The "block selection" approach discussed above with respect to FIGS. 1a and 1b may result in some confusion as to which ink strokes are actually selected and/or highlighted in these systems where input is more freeform in nature.

The prior art approach to selecting images, as opposed to the regimented text of traditional word processors, does not offer a much better solution. FIGS. 2a and 2b show examples of how an image, such as a simple diagonal line, may appear when selected. If the line is a simple vector line created, for example, using a line drawing option available in Microsoft's VISIO® drawing program, the selected line's only change in appearance is the addition of selection handles 250 at the endpoints (see FIG. 2a). If the line is an image, such as a bitmap image, its appearance upon selection changes to include the addition of a selection box 240 with handles 250 located around the periphery of the image (see FIG. 2b). There are drawbacks to each of these approaches, particularly if one seeks to extend these approaches to the freeform ink input regime of pen-based computing systems. In the approach of FIG. 2a, the mere addition of handles 250 may not clearly indicate the selected graphical object, particularly when the information on the GUI is very detailed, colorful, and/or dense. In the approach of FIG. 2b, while the selected line image may be identified adequately by the surrounding box 240 and handles 250, there is much wasted white space attributed to this selected line. This white space is wasteful, as it obscures more visual "real estate," or displayable area of the GUI, than may be necessary to enclose a desired selection area. Additionally, selection of an excessive amount of white space may hinder the user's ability to see, modify, or add additional ink close to the selected ink stroke.

Additional difficulties may exist when using pen-based computing systems as a replacement for conventional pen and paper. One feature that users may wish to have available in such pen-based computing systems is the ability to emphasize their handwritten ink in some way, to make it stand out from the other writing or information on the electronic and/or printed page. In the world of conventional pen and paper, this task may be accomplished easily, for example, by using a highlighter pen to emphasize the desired portion of the ink to be highlighted. While this same approach also could be extended into an electronic pen-based computing system (i.e., by passing a stylus over the desired writing a second time to apply a highlight color), this procedure is somewhat cumbersome in that it requires a change of electronic pens and a second pass over the electronic ink to be highlighted. Additionally, application of a second layer of highlighter colored ink in this manner results in storage of the highlighter ink and the underlying ink it is emphasizing as two separate entities. This independent storage causes difficulties when a user seeks to move, resize, copy, paste or otherwise manipulate the highlighted electronic ink. In other words, because the underlying electronic ink and the highlighting ink are stored as two separate entities, when the user performs an operation on the electronic ink, she also must perform that same operation on the highlighting ink to be associated with it, or the highlighting feature may be lost, misapplied, incorrectly sized, or otherwise improperly applied to the page.

The above difficulties in applying electronic highlighting to electronic ink are further exacerbated when one adds the additional difficulties associated with rendering the highlighting ink and the underlying highlighted strokes when that ink (or a portion thereof) also is being selected by the user (e.g., by a click-and-drag procedure for copying, pasting, moving, resizing, or otherwise manipulating the ink). When selecting, a user must be capable of readily seeing: (a) that highlighted ink is selected and (b) the amount of highlighted ink selected. In other words, the highlighted characteristics of the underlying ink must not be obscured during an ink selection operation.

Accordingly, there is a need for an improved approach to highlighting and identifying selected ink in a GUI environment that can overcome one or more of the deficiencies identified above.

SUMMARY OF THE INVENTION

Aspects of the present invention relate to data structures, systems, methods, and computer-readable media for rendering and editing digital ink, for example, in a pen-based computing system, to include highlighting attributes that address one or more issues mentioned above. In one aspect, this invention relates to methods for rendering electronic ink with a highlighting attribute, which methods include: (a) receiving data representing at least one electronic ink stroke including a highlighting attribute; (b) rendering a first highlighting stroke in a first dimension and in a first highlighting color and/or pattern; and (c) rendering an ink color stroke in an ink color and/or pattern and in a second dimension that is smaller than the first dimension to produce a composite stroke that has a highlighted appearance. A third highlighter colored stroke and/or pattern, inside the ink colored stroke and/or pattern, may be rendered, for example, to show that the highlighted stroke also is selected. Aspects of the invention also may relate to systems and computer-readable media for performing these methods and to data structures that include a highlight attribute associated with electronic ink data (e.g., ink data representing an individual ink stroke or a set of strokes).

BRIEF DESCRIPTION OF THE DRAWINGS

The above and other objects, features, and advantages of the present invention will be readily apparent and fully understood from the following detailed description, taken in connection with the appended drawings, which include:

FIGS. 8a through 8c, which illustrate example renderings of text using the systems and methods of FIG. 7.

DETAILED DESCRIPTION

Figure 1B:
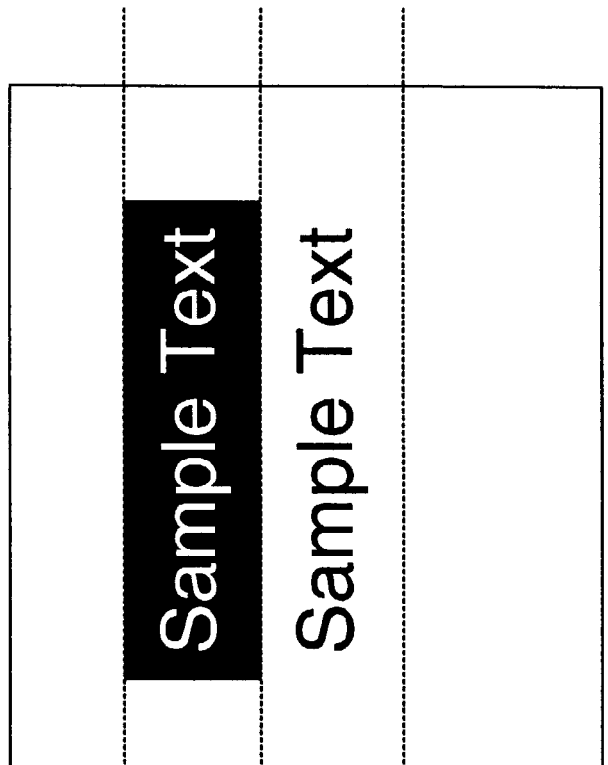
FIGS. 1a and 1b, which illustrate an example of selected text in a prior art word processing program.

As described above, examples of the present invention relate to data structures, systems, methods, and computer-readable media for editing and rendering digital ink that includes a highlighting attribute, e.g., in a pen-based computing system. The following describes various examples of the invention in more detail.

The following description is divided into sub-sections to assist the reader. The sub-sections include: Terms, Example Hardware, Example Data Structures, Example Highlighted Graphical Objects, and Conclusion.

I. TERMS

Ink—A sequence or set of one or more handwritten strokes. A sequence of strokes may include one or more strokes in an ordered form. The sequence may be ordered, for example, by the time the stroke was captured or by where the strokes appear on a page. Other orders are possible. A set of strokes may include one or more sequences of strokes or unordered strokes or any combination thereof. The ink may further include properties that may be defined for the strokes. The ink may further respond to methods and trigger events.

Stroke—A sequence or set of one or more captured points. For example, when rendered, the sequence of points may be connected with lines. Alternatively, a stroke may be represented as a point and a vector in the direction of the next point. Further, a stroke may be referred to as a data structure containing a simple list (or array or table) of points. In short, a stroke is intended to encompass any representation of points or segments relating to ink, irrespective of the underlying representation of points and/or what connects the points.

Point—Information defining a location in space. For example, a point may be defined relative to a capturing space (for example, points on a digitizer) and/or a display space (the points or pixels of a display device). Points may be represented using a variety of known techniques including two dimensional Cartesian coordinates (X, Y), polar coordinates (r, Θ), three dimensional coordinates ((X, Y, Z), (r, Θ, p), (X, Y, t (where t is time)), (r, Θ, t)), four dimensional coordinates ((X, Y, Z, t) and (r, Θ, p, t)), and other techniques as known in the art.

Render—The process of determining how graphics (and/or ink) are to be displayed, whether on a screen or printed.

Ink Word—One or more handwritten strokes captured by some systems according to the invention. Each stroke in an ink word has a location associated with the stroke.

Space—An area with no displayed content In some instances, when referring to separations between adjacent words (also called "inter-word spacing"), "space" may refer to a separate word with no strokes. When referring to a blank area on a page, "space" (or "white space") may refer to area on the page that contains no strokes or other graphical information.

Highlight—Marking at least a portion of ink in some manner to make it stand out when rendered. "Highlighting" also is referred to as "glow," "glowing," or "glow highlighting" in this specification. Highlighting may be stored as an attribute of a stroke, of an ink word, or of any other suitable set or sequence of strokes.

Select—Choosing at least a portion of ink, optionally for a common manipulative operation, such as cutting, pasting, moving, resizing, bolding, etc.

II. EXAMPLE HARDWARE

Figure 3:
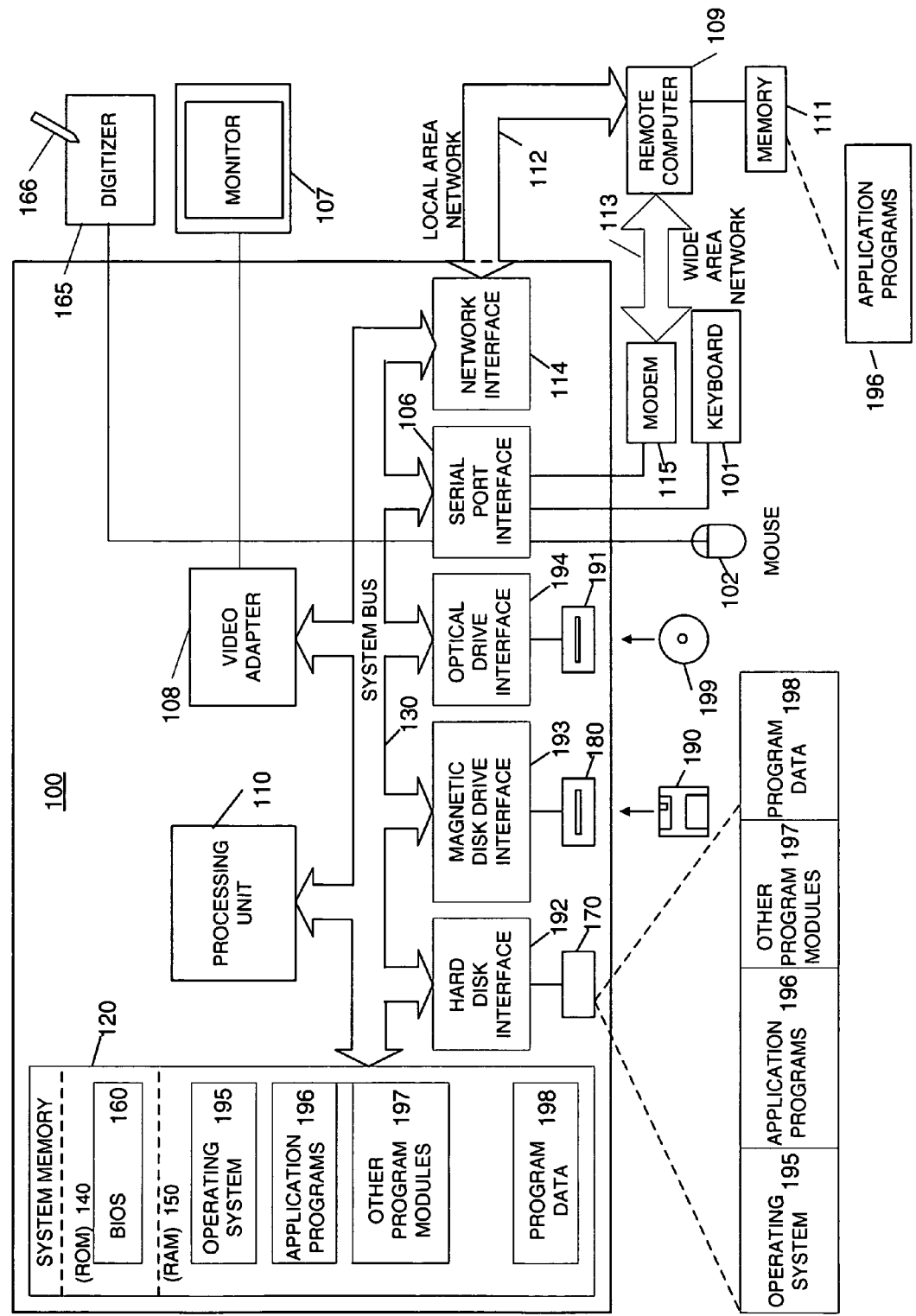
FIG. 3, which illustrates a schematic diagram of a conventional general-purpose digital computing environment in which one or more examples of the present invention may be implemented.

The present invention may be more readily described with reference to FIGS. 3-11. FIG. 3 illustrates a schematic diagram of a conventional general-purpose digital computing environment that can be used to implement various aspects of the present invention. In FIG. 3, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer readable instructions, data structures, program modules, and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB). Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 3, in practice, the pen digitizer 165 may be directly coupled to the processing unit 110, or it may be coupled to the processing unit 110 in any suitable manner, such as via a parallel port or another interface and the system bus 130 as known in the art. Furthermore, although the digitizer 165 is shown apart from the monitor 107 in FIG. 3, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 3. The logical connections depicted in FIG. 3 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although the FIG. 3 environment shows an example environment, it will be understood that other computing environments may also be used. For example, one or more examples of the present invention may use an environment having fewer than all of the various aspects shown in FIG. 3 and described above, and these aspects may appear in various combinations and subcombinations that will be apparent to one of ordinary skill.

Figure 4:
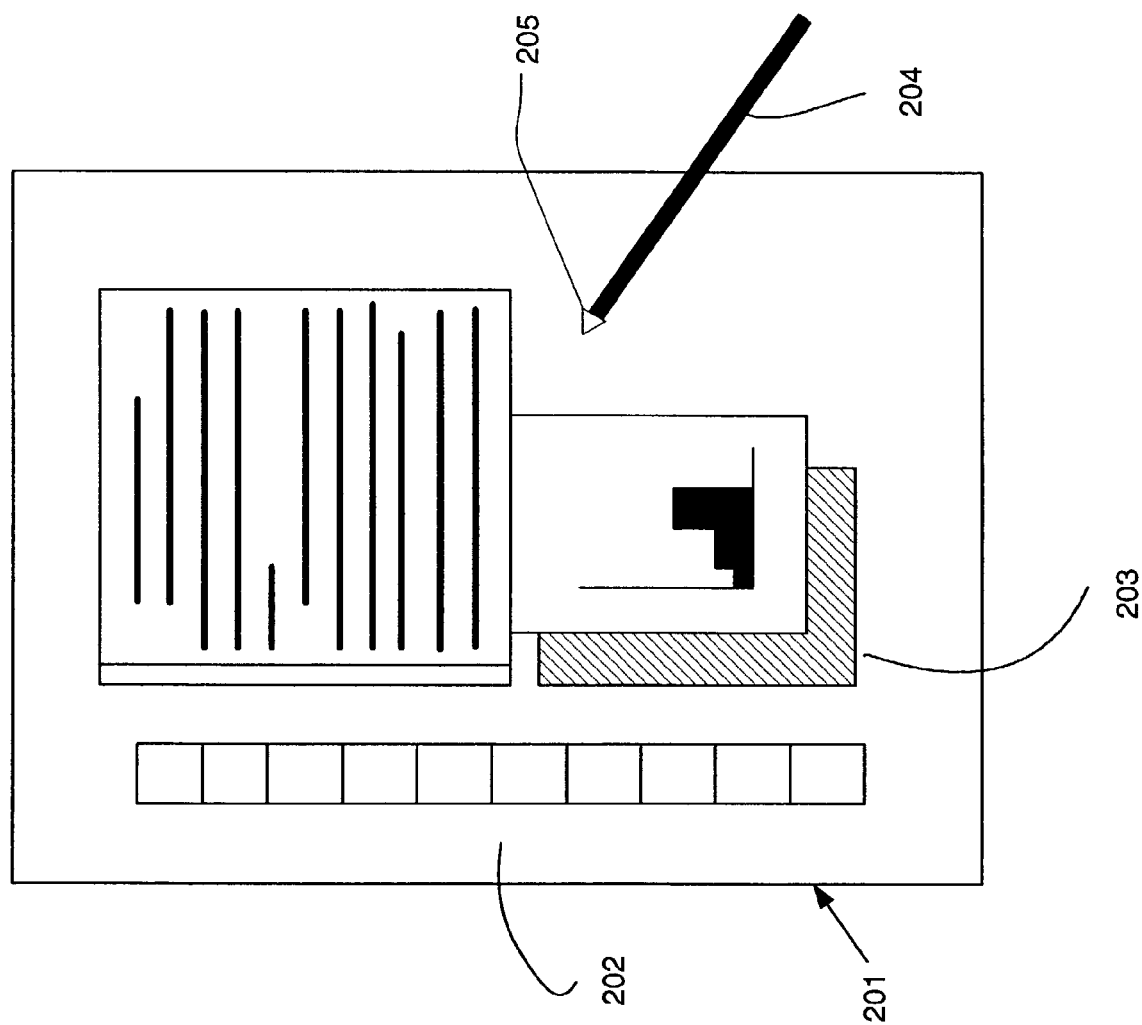
FIG. 4, which illustrates a pen-based personal computing (PC) environment in which one or more examples of the present invention may be implemented.

FIG. 4 illustrates a pen-based personal computer (PC) 201 that can be used in accordance with various aspects of the present invention. Any or all of the features, subsystems, and functions in the system of FIG. 3 can be included in the computer of FIG. 4. The pen-based personal computer system 201 includes a large display surface 202, e.g., a digitizing flat panel display, preferably, a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. The pen-based computing system 201 interprets gestures made using stylus 204 in order to manipulate data, enter text, and execute conventional computer application tasks, such as creating, editing, and modifying spreadsheets, word processing programs, and the like.

The stylus 204 may be equipped with buttons or other features to augment its selection capabilities. In one example, a stylus 204 could be implemented as a "pencil" or "pen", in which one end constitutes a writing portion and the other end constitutes an "eraser" end, and which, when moved across the display, indicates portions of the display that are to be erased. Other types of input devices, such as a mouse, trackball, or the like also could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

III. EXAMPLE DATA STRUCTURES

One aspect of this invention relates to data structures for storing electronic ink. In data structures according to some examples of the invention, data is stored representing electronic ink, and an indicator is stored relating to a highlight attribute of the data. As one example, the stored indicator may indicate whether a highlight feature is ON or OFF for the stored electronic ink data. As another example, the indicator may indicate or assign a glow color and/or pattern to the ink data or a value of NONE or not include a glow color and/or pattern assignment, to thereby indicate that there is no glow color and/or pattern associated with the ink data. The data representing the electronic ink may, for example, include data representing any individual stroke or collection of strokes, such as electronic ink words, lines, paragraphs, blocks, pages, or the like.

One advantage of assigning a glow color and/or pattern to the ink is the ability to be consistent with a current color scheme. For example, a color scheme may designate a default ink color as blue with a glow color as a lighter shade of blue, and a contrasting color (like red) or any other suitable color for the ink color when highlighted. Further, the glow color and/or pattern may be set to vary over two or more colors, thereby permitting a greater level of expressiveness in the ink (or to assist in distinguishing between the highlighting of two different persons).

The following provides examples of data structures that may be used in storing electronic ink strokes and their corresponding ink "highlight" attributes or status in accordance with the invention. The following description is intended to merely illustrate possible examples of suitable data structures and is not intended to be limiting.

In some examples of data structures used according to the invention, ink "strokes" are stored in memory as a series or set of associated digitizer points encountered by the stylus as the user makes a stroke across the digitizer surface. As an example, stroke capture may begin when the pen goes down and encounters the digitizer surface and may end when the pen is lifted from the digitizer surface. As the pen is dragged, the system builds a list of points corresponding to the path of the stroke. The system may store information for identifying a stroke in various other ways without departing from the invention. For example, strokes could be measured based on all digitizer points encountered during a predetermined time interval.

Figure 5B:
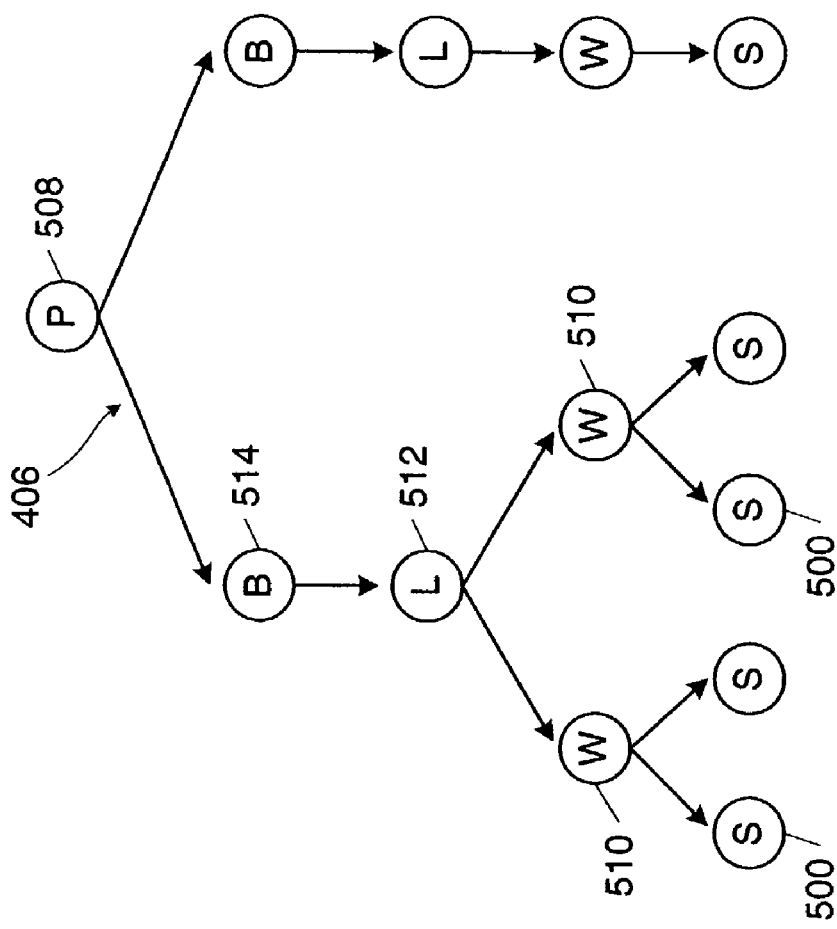
FIGS. 5a and 5b, which graphically illustrate examples of representations of data structures that may be used in some examples of the present invention.
Figure 5A:
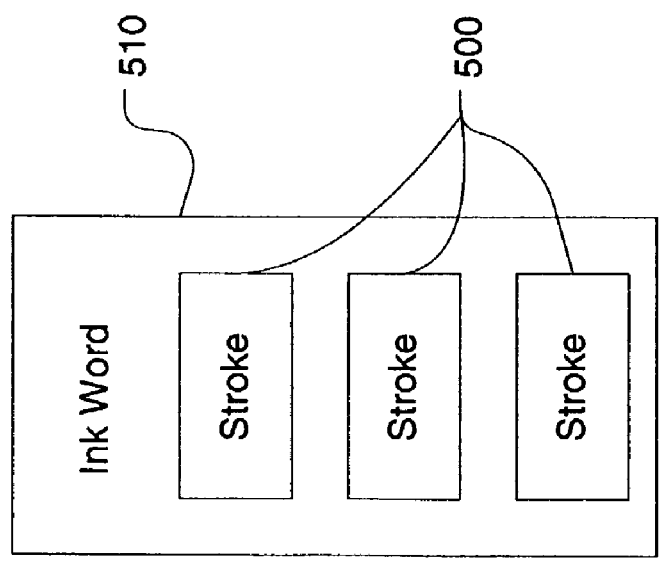

FIGS. 5a and 5b illustrate example representations of data structures that may be used to store electronic ink in some examples of the invention. As shown in FIG. 5a, associated strokes 500 may be grouped together and stored as ink "words" 510. Any suitable algorithm for or other way of grouping individual strokes 500 into words 510 may be used without departing from the invention (e.g., including manual grouping by a user). As another example, associated ink words 510 may be grouped together as shown in FIG. 5b and stored as ink "lines" 512, and additionally, associated ink lines 512 may be grouped together and stored as ink "blocks" 514 (akin to paragraphs when writing). One or more blocks 514 may be grouped together and stored to form a "page" 508 of associated electronic ink data. A page 508 of electronic ink data may optionally correspond to a pen-digitizer surface page 202, as illustrated in FIG. 4, all or part of an electronic document, or any other suitable collection of electronic ink data. Alternatively, the blocks 514 may be omitted and element "P" may represent a paragraph. As still another alternative, the lines 512 may be omitted and words 510 may be associated together as blocks 514 of ink data. Pages will be used at some times in the following disclosure to assist in the explanation.

Accordingly, in the illustrative data structure illustrated in FIG. 5b, a page 508 of electronic ink data may include one or more blocks 514 of ink data. Each block 514 of ink data may include one or more lines 512 of associated ink data, and each line 512 may be comprised of one or more ink words 510. Similarly, each ink word 510 may contain zero or more individual ink strokes 500 (as will be explained in more detail below, inter-word spacing, in some examples, may be represented in a data structure as a word 510 containing zero strokes). Each individual ink stroke 500 may contain information identifying zero or more digitizer points.

As described above, a user may encounter difficulties in maintaining highlighting ink with the underlying electronic ink to be highlighted when the underlying ink and the highlighting ink are stored by the system as separate entities. For example, in such systems, simply copying the ink may not always properly copy the highlighting ink or the highlighted property of the ink. In accordance with at least some examples of the present invention, instead of separately storing a highlighting stroke as an independent ink stroke, the systems according to at least some examples of the invention apply glow highlighting as an attribute to the individual ink stroke(s). This may be accomplished, for example, before the stroke(s) to be highlighted is (are) applied to the digitizer surface (e.g., by selecting a "highlight" feature from a menu or otherwise activating a "highlighting" feature) and/or after the stroke(s) to be highlighted has (have) been rendered on the GUI (e.g., by selecting the desired strokes and then selecting or activating a "highlight" feature). When the glow highlighting feature is activated in at least some examples of the invention, each highlighted stroke in the data structure is marked with a "highlight" attribute, and this marking stays with that stroke in the data structure in all future operations associated with the stroke (at least until the user deactivates the "highlight" attribute associated with that stroke). Thus, if the highlighted ink is copied, pasted, cut, moved, resized, or otherwise manipulated by the user or the system platform, corresponding manipulations will occur on the highlighting to maintain the highlighting along with the stroke to which it was originally associated.

More detailed examples of data structures useful in the present invention may be helpful in illustrating this aspect of the invention. Various data structures may be used to store "pages" or "blocks" or other electronic documents including ink data. For example, tables may be used with rows identifying the lines on a page (e.g., a physical digitizer page) and columns storing information relating to the strokes of electronic ink on that line. Alternatively, the data structure may include a linked list, linking one block of ink data to the next. Further, the data structure may include a double linked list between blocks of ink data. It is appreciated that a variety of data structures may be used to store the ink data. The data structures may be page-based, document-based, block-based, line-based, or any other associative system.

Each block of electronic ink data may have a starting coordinate composed of its line number and the X-coordinate on the line, as well as a desired width (which may be used during rendering to set the block's width). Words may include the bounding rectangle of their strokes, to allow fast hit-testing. Each stroke may include an array of points in the format needed to render the word (e.g., in screen coordinates, higher resolution raw digitizer coordinates, or both), as well as data representing overall stroke width, stroke color, and whether the stroke has glow highlighting associated with it (as well as a glow highlighting color and/or pattern). The stroke coordinates may be recomputed whenever the stroke is moved.

Figure 6A:
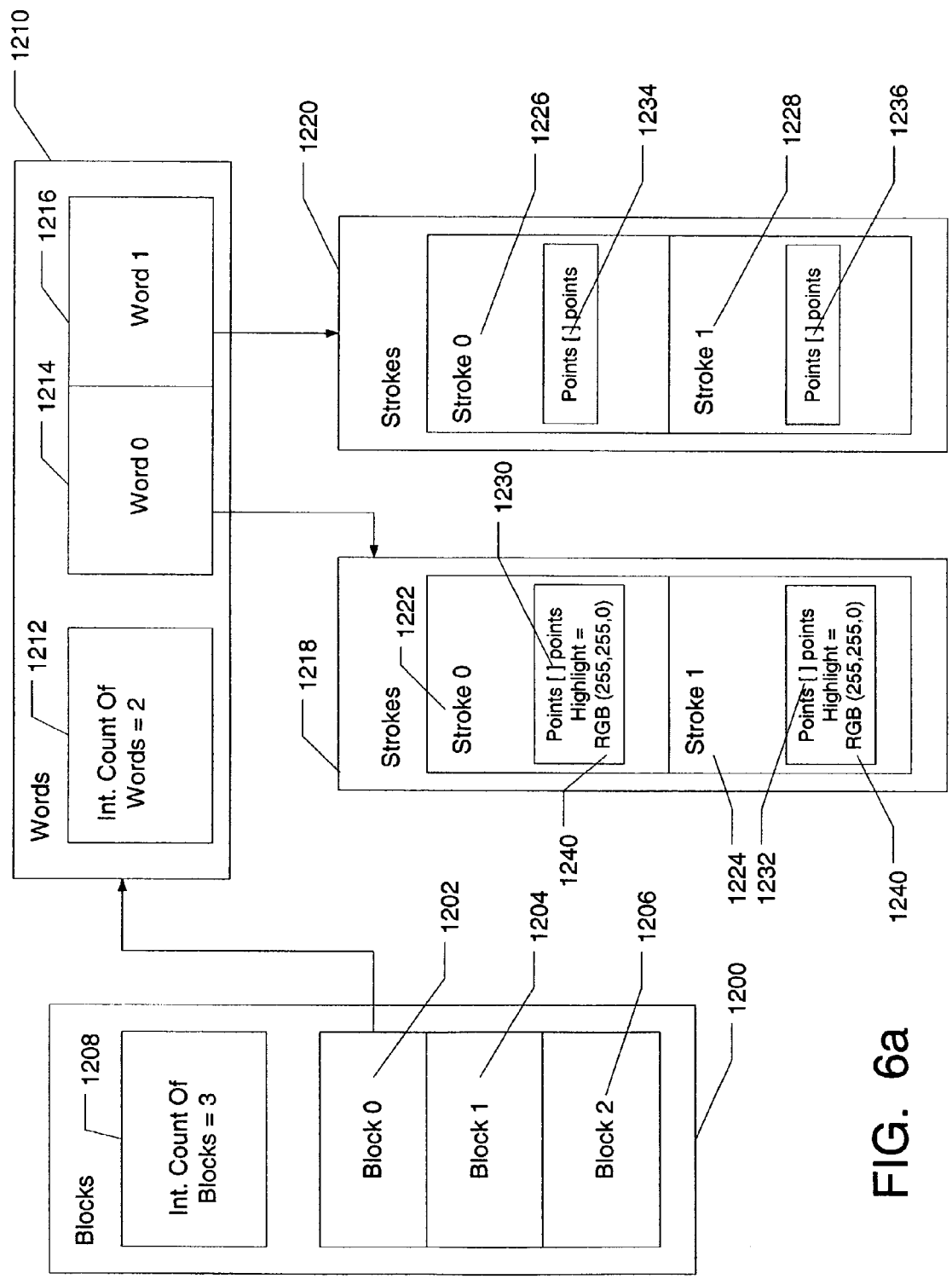
FIGS. 6a and 6b, which graphically illustrate additional examples of representations of data structures that may be used in some examples of the present invention.

FIG. 6a illustrates an example of a data structure that can be used for storing a highlight attribute according to at least some examples of the invention. In this example, electronic ink data for a document 1200 (which may correspond to a single page or numerous pages of electronic ink data) is stored as a series of Blocks 1202, 1204, and 1206, wherein an individual Block 1202, 1204, and 1206 may correspond to a paragraph, a line, or any other suitable associated collection of ink strokes. Each document 1200 contains a block counter 1208, which indicates the internal count or number of blocks of ink data contained in the electronic document 1200. In the illustrated example, the electronic document 1200 contains three blocks of ink data, namely, Block 0 1202, Block 1 1204, and Block 2 1206.

Each Block 1202, 1204, and 1206 of the electronic document 1200 links or points to an associated list of ink words. In the illustrated example, Block 0 1202 links or points to a list of Words 1210 associated with Block 1202. Each Word list data set 1210 contains a counter 1212, which provides an internal count of the number of words in the associated Block. In the illustrated example, Block 1202 contains two words, namely Word 0 1214 and Word 1 1216, as indicated by counter 1212.

In a similar manner, in this example of a data structure according to the invention, each individual Word 1214 and 1216 links or points to a data array containing a list of stroke data. As illustrated, Word 0 1214 links or points to Stroke listing 1218 and Word 1 1216 links or points to Stroke listing 1220. Each Stroke listing 1218 and 1220 contains a listing of individual strokes in the word (Strokes 1222, 1224, 1226, and 1228), and each individual Stroke includes a listing or array of point(s) 1230, 1232, 1234, and 1236 associated with the Stroke.

In the example illustrated in FIG. 6a, Word 0 1214 has a highlight attribute associated with it, while Word 1 1216 does not. This is shown in the data structure by a highlight color attribute 1240 assigned to the individual Strokes 1222 and 1224.

Notably, the strokes 1226 and 1228 of Word 1 1216 do not have a highlight color assigned to them, and thus these Strokes 1226 and 1228 are not highlighted.

The data structure described in conjunction with FIG. 6a is advantageous in that it may be implemented using dynamic arrays of data that allow direct access to the data while limiting the wasted memory that would result using static arrays that contained a few elements. Of course, many variations are possible without departing from the invention. For example, the highlight attribute could be associated with or provided in the data for Word 0 1214, because all strokes of this word are highlighted in this example.

Figure 6B:
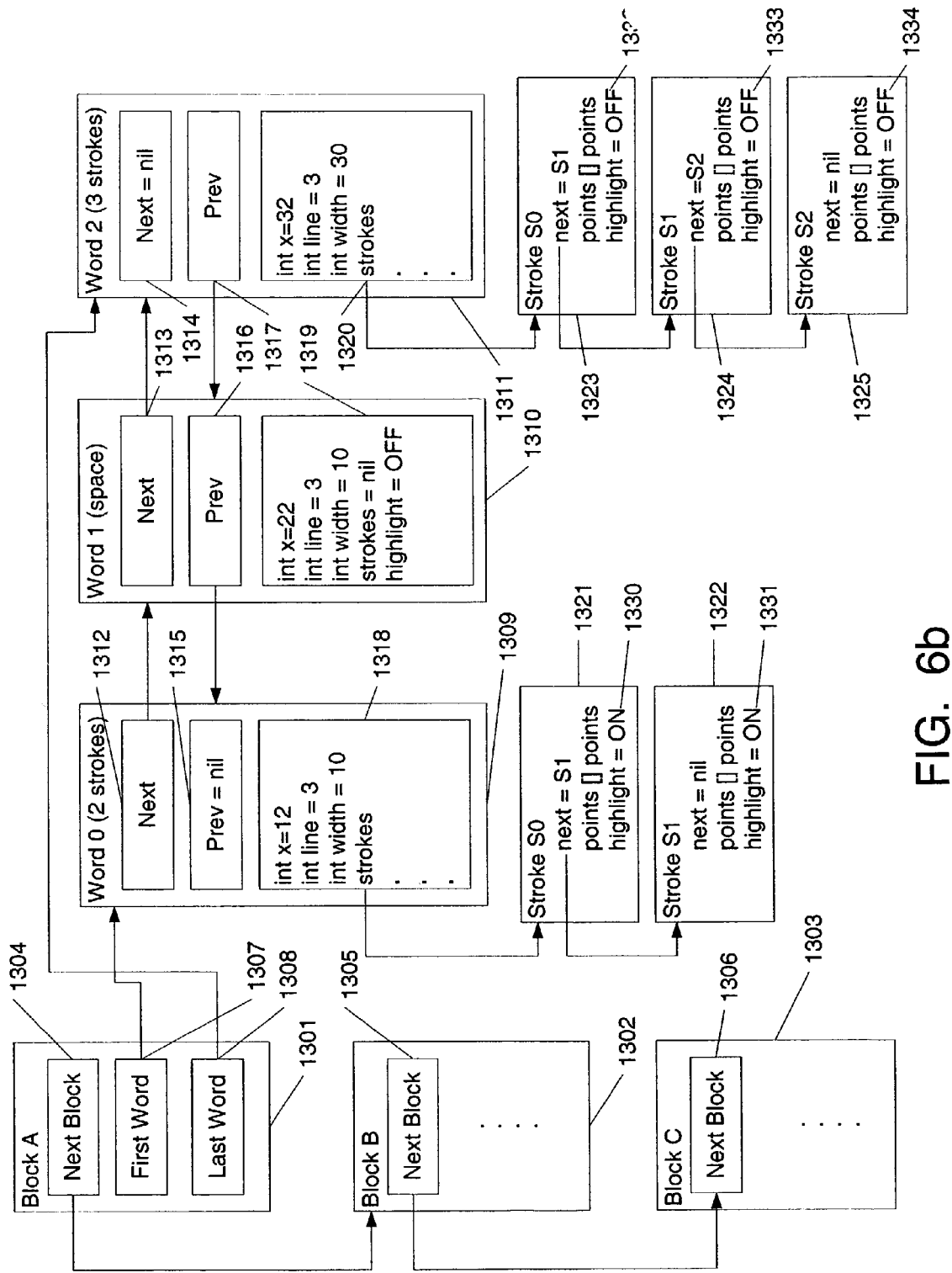

FIG. 6b illustrates another example of a data structure that may be used in connection with various examples of the invention. As illustrated in FIG. 6b, this illustrative data structure includes a listing of independent blocks of ink data, namely block A 1301, block B 1302, and block C 1303, with a pointer 1304, 1305, and 1306 to the next block on the page. Each block may include a linear list of words. For example, as illustrated for block A 1301, the block includes a first word 1307 and a last word 1308.

Each word in the block links to a word data set, which includes a list of strokes. For example, the first word 1307 in block A 1301 links to a word data set, namely Word 0, at reference number 1309. Similarly, the last word 1308 in block A 1301 links to a word data set, namely Word 2, at reference number 1311. The first and last words 1307 and 1308 of block A are separated by a space, which may be represented in the data structure as a separate word (Word 1 1310) that contains no strokes.

The data set for each word in the block first includes a pointer to the next word (pointers 1312 and 1313) or an indicator that the word is the last word in the block (indicator 1314). Additionally, the data set for each word in this example includes a pointer to the previous word (pointers 1316 and 1317) or an indicator that the word is the first word in the block (indicator 1315).

The data set for each word in the block also may include word information. This word information may include an indicator of the initial X-coordinate value, the initial line number on the page grid, the initial width of the word, and the like. See data sets 1318, 1319, and 1320 in FIG. 6b. Data sets 1318, 1319, and 1320 also include pointers to the strokes of the word, if any (as noted in FIG. 6b, Word 1 1310 is a blank space, which is represented as a word containing no strokes).

The strokes of the word are represented by data sets 1321, 1322, 1323, 1324, and 1325 in FIG. 6b. Each stroke data set, as illustrated in FIG. 6b, may include a pointer to the next stroke or an indicator that the stroke is the final stroke of the word ("next" stroke=nil). Additionally, each stroke data set may include an indicator 1330-1334 whether the stroke has glow highlighting activated. In the example illustrated in FIG. 6b, Word 0 has been highlighted (each stroke of Word 0 has the highlight attribute turned ON), while Word 2 has not been highlighted (the highlight attribute is turned OFF on each stroke of Word 2). Optionally, the stroke data set also may include data indicating a glow highlighting color and/or pattern or color palette, or a relation used to determine a highlight color and/or pattern (for example, the system may use the inverted color of the present ink color as the highlight color and/or pattern). The stroke data sets 1321, 1322, 1323, 1324, and 1325 also may include a listing of points registered on the digitizer that correspond to the stroke (or another appropriate data representation of the stroke).

Of course, hierarchical data structures like those described above are not necessary for practicing the invention. For example, it is not necessary to group individual strokes into words, and words into lines and/or blocks and/or pages in order to practice the invention. Rather, the glow highlighting attribute may be included in the data structure for any individual stroke (including strokes representing blank space) or groups of strokes. Additionally, it is not necessary that the glow highlighting attribute be fixed to each individual stroke in the data structure. Rather, if desired, the glow-highlighting attribute may be associated with words, lines, and/or even blocks of strokes without departing from the invention, particularly when an entire word, line, or block of data is to be highlighted. Associating the highlight attribute to as large of electronic ink data set as possible (e.g., words, lines, blocks, pages, etc.) may help accelerate the data processing and rendering procedures, particularly where large volumes and/or consecutive strokes of the ink data are to be highlighted.

Additionally, use of glow highlighting is not limited to text-based types of input ink or strokes. Rather, a highlight attribute can be associated with any type of stroke or group of strokes, without departing from the invention, including, without limitation, drawing-type strokes, graphs, tables, etc.

IV. EXAMPLE HIGHLIGHTED GRAPHICAL OBJECTS

This invention also generally relates to methods of rendering electronic ink with a highlighting attribute, systems for rendering highlighted electronic ink, and computer-readable media for instructing a computer to render highlighted electronic ink. In general, a method for rendering electronic ink in accordance with some examples of the invention includes: (a) receiving data representing at least one electronic ink stroke, wherein the data indicates that the at least one electronic ink stroke is to be highlighted; (b) rendering a first highlighting stroke in a first dimension and in a first highlighting color and/or pattern; and (c) rendering an ink color stroke in an ink color and/or pattern and in a second dimension that is smaller than the first dimension, wherein the first highlighting stroke and the ink color stroke are rendered so as to produce a composite ink stroke that has a highlighted appearance. The ink color stroke at least partially, and in some examples completely, overlays (e.g., appears to lay atop) the first highlighting stroke. Both the highlighting stroke and the ink color stroke may be generally in the same shape as the original ink stroke, with differing dimensions.

In another aspect, examples of the invention relate to methods for rendering electronic ink that include: (a) receiving data representing at least one electronic ink stroke, wherein the data indicates that the at least one electronic ink stroke is to be highlighted; (b) rendering a first highlighting stroke in a first dimension and in a first highlighting color and/or pattern; (c) rendering an ink color stroke in an ink color and/or pattern and in a second dimension that is smaller than the first dimension; and (d) rendering a second highlighting stroke in a second highlighting color and/or pattern and in a third dimension that is smaller than the second dimension, wherein the first highlighting stroke, the second highlighting stroke, and the ink color stroke are rendered so as to produce a composite ink stroke that has a highlighted appearance. In this example, the second highlighting color and/or pattern may be the same as or different from the first highlighting color and/or pattern. Again, the narrower highlight and ink colored layers may completely or partially overlay the wider layers. This procedure may be particularly useful, for example, in rendering highlighted strokes that have been selected, e.g., by a click-and-drag, tap-and-drag, or hover-and-drag operation. All three renderings (i.e., the ink colored rendering and both highlight color renderings) may be generally in the same shape as the original stroke (with differing dimensions).

Another aspect of some examples of the invention relates to methods comprising: (a) rendering a highlighted ink stroke with a first outer highlight color and/or pattern and a first inner ink color and/or pattern different from the first outer highlight color and/or pattern; (b) selecting at least the highlighted ink stroke; and (c) when selected, rendering the highlighted ink stroke with a second outer highlight color and/or pattern, a second inner ink color and/or pattern, and a first inner highlight color and/or pattern. Again, the highlighter and/or ink colors and/or patterns can be freely and independently selected without departing from the invention, and the narrower ink colors and/patterns may completely or partially overlay the wider colors and/or patterns. The first outer highlight color and/or pattern may be the same as the second outer highlight color and/or pattern and/or the first inner highlight color and/or pattern, if desired. Additionally, the first inner ink color and/or pattern may be the same as the second inner ink color and/or pattern, if desired.

As further noted above, aspects of this invention also relate to computer-readable media having computer-executable instructions for performing the methods described above, as well as to apparatuses and/or systems for performing the methods described above, including inputs constructed and adapted to receive the electronic ink data, storage devices for storing the ink data, and/or one or more processors adapted to render the data (e.g., on screen or as a printed page).

Figure 7:
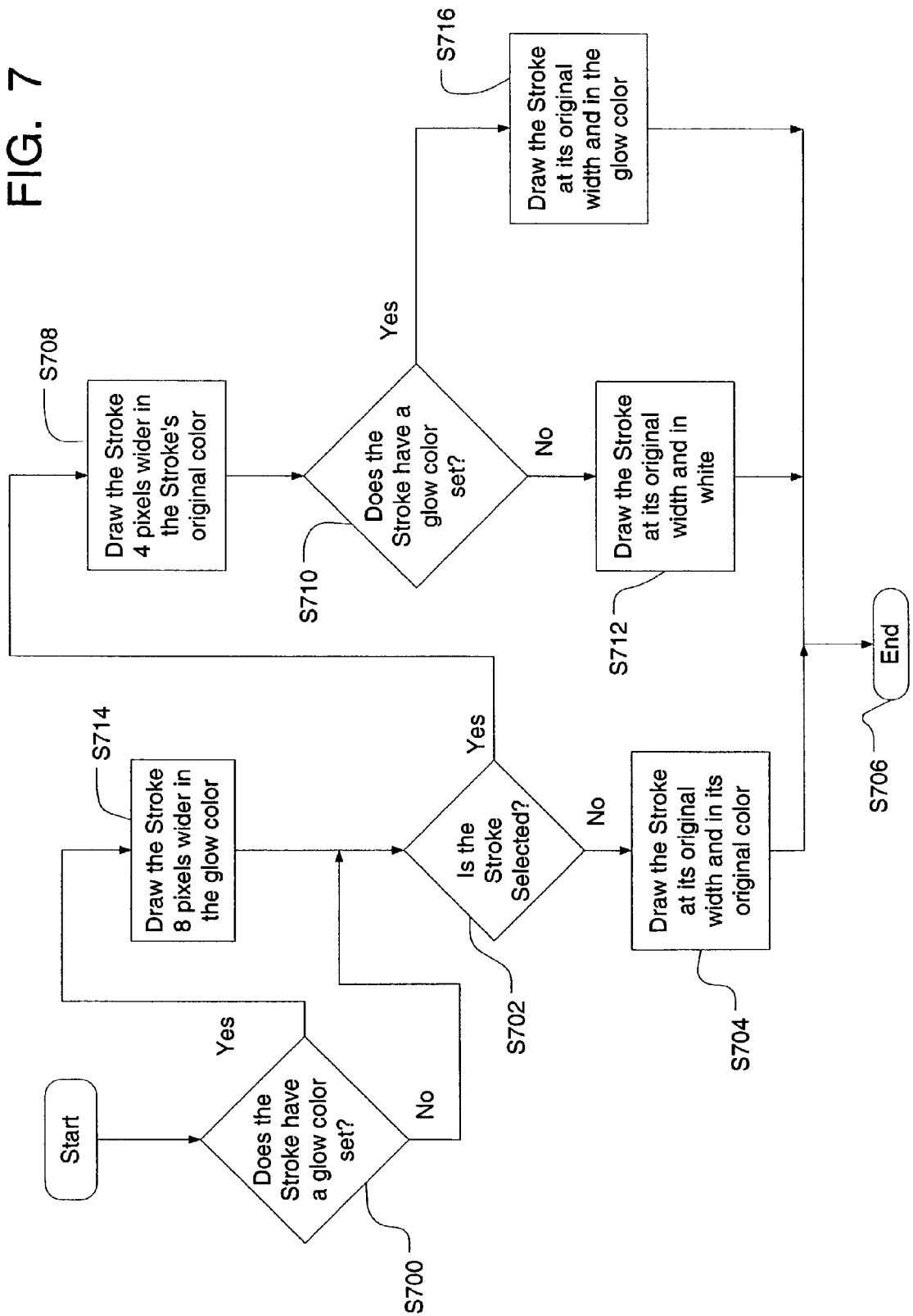
FIG. 7, which illustrates a flow diagram of operation of examples of systems and methods according to the invention.

Examples of systems, methods, and computer-readable media for rendering the highlighted strokes, for example, on a GUI, in accordance with examples of this invention will now be described in more detail in association with the flow diagram of FIG. 7. As the illustrative procedure of FIG. 7 starts, the system first determines whether the stroke to be rendered has a glow color set associated with it (Step S700). If it does not (answer "No"), the system renders the stroke in the following manner. Specifically, the system next determines whether this particular stroke has been selected (Step S702), e.g., by the user through a click-and-drag, tap-and-drag, or hover-and-drag type operation. If again "No," the system renders the stroke in its original ink color, at its original ink width (Step S704), and the procedure ends (Step S706). The rendering may appear at any suitable location, for example, on screen or on a printed page. An example of ink rendered in this manner is shown in FIG. 8*a*.

If, at Step S702, the system determines that the stroke has been selected (answer "Yes"), the system then renders the stroke 4 pixels wider than its original width, in the stroke's original ink color (Step S708). Then, the system again determines whether the stroke has a glow color set associated with it (Step S710). In this specific example, as noted above in Step S700, the stroke did not have a glow color set, so the answer at Step S710 is again "No." Accordingly, the system then renders the stroke at its original width and in white (or any other suitable color and/or pattern; Step S712), such that the white stroke overlays (at least partially) the wider, ink-colored, stroke-shaped rendering. The procedure then ends (Step S706).

Accordingly, in this example, when there is no glow color associated with the stroke, the system renders strokes in the following manner: (a) non-selected strokes are rendered in the original ink color at the original stroke width (FIG. 8*a*), and (*b*) selected strokes are rendered in white (or another appropriate color) on a wider, stroke-shaped background provided in the ink's original color (or another appropriate color).

Figure 10:
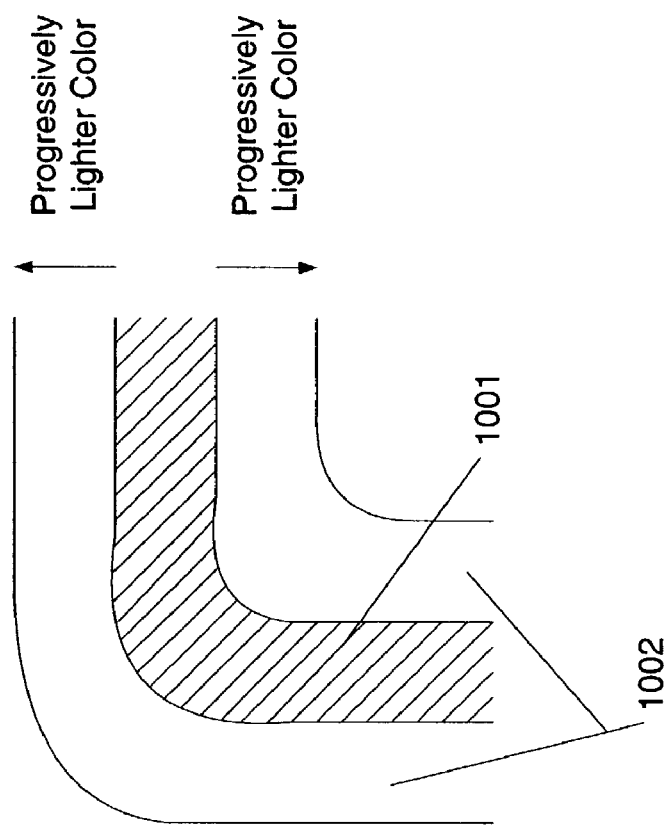
FIGS. 9-11, which illustrate enlarged views of various examples of renderings including highlighting that may be used in some examples of the invention.

When the stroke to be rendered has a glow color set associated with it (answer "Yes" at Step S700), the system then renders the stroke 8 pixels wider than its original width and in the glow color (Step S714). Then, the system determines whether the stroke has been selected (Step S702). If no, Step S704 is repeated, and the stroke is rendered again in its original color and at its original width. In this manner, as illustrated in FIG. 8b, the original ink width and color 802 overlays a portion of the wider glow colored stroke 804 produced in Step S714, thereby rendering the stroke in its original color on a background that appears highlighted or glowing. FIG. 10 illustrates an enlarged view of such highlighting, in which the original ink colored stroke 1001 overlays a wider highlight colored rendering of the stroke 1002.

If, at Step S702, the system determines that the stroke has been selected by the user (answer "Yes"), the system then proceeds to Step S708 in which the stroke is rendered over the earlier produced glow colored stroke (from Step S714) at a width 4 pixels wider than its original width, in the original ink color. Therefore, at this time, this selected stroke has been rendered twice, once in the glow color and 8 pixels wider than its original width (layer 806 in FIG. 8c), and once in its original color and 4 pixels wider than its original width (layer 808 in FIG. 8C), with the latter layer overlaying the former layer.

The system then again determines whether the stroke has a glow or highlight color set associated with it (Step S710). In this specific example, the answer will again be "Yes" (as it was at Step S700), so the system will proceed to Step S716, in which the stroke is rendered a third time. In this example, the stroke is rendered at its original width and in the glow color 810, which rendering overlays the intermediate ink colored layer 808. Accordingly, at this time, the selected stroke will be rendered three times, as illustrated in FIG. 8c (and in the enlarged view of FIG. 11), such that the rendered stroke will have a wide outer glow colored layer 806 (and 1102), an intermediate original ink colored layer 808 (and 1101), and an inner glow colored layer 810 (and 1100).

Of course, many modifications to the specific details of the above-described procedure can be made without departing from the invention. For example, the widths of the various ink renderings and the colors and/or patterns thereof can be freely selected without departing from the invention. Also, the number of renderings used to produce the highlighted and/or selected appearance may vary without departing from the invention. Additionally, while the above-described example determines the width of the various widened ink or highlight colored layers based on digitizer pixel widths, this is not a requirement. For example, the widths of these layers may be selected based on absolute dimensions (e.g., 1/16 inch, 1/8 inch, 1/4 inch, etc.), or the various widths may be determined, for example, as a function of the size of the stroke(s) being highlighted, the average stroke size on the page, block, line, or word, the size resolution of the display, or in any other suitable manner.

The following describes some potential variations on the glow or highlighting that may be used according to the invention. These potential variations should be construed as examples of possible variations, and not as a comprehensive listing of all possible variations.

The body of a graphical object or stroke, including its highlighting or selection features, may be drawn, or rendered, using any color or pattern value (e.g., hatched, shaded, a series of colors, etc.), and it may be rendered on a background of a different color or pattern. All of the highlighting, selection, and original ink may be shown in different colors, combinations of colors, and/or patterns without departing from the invention.

Figure 1A:
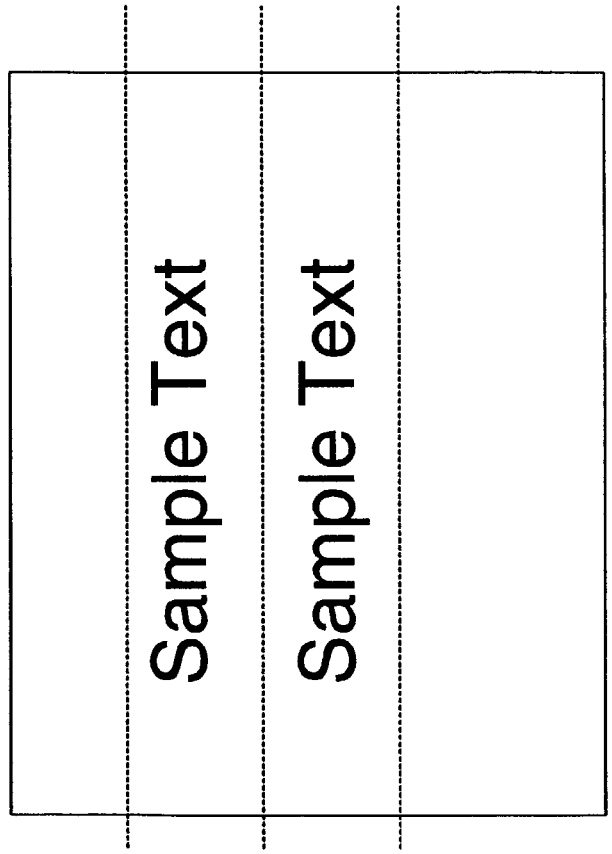
Figure 2B:
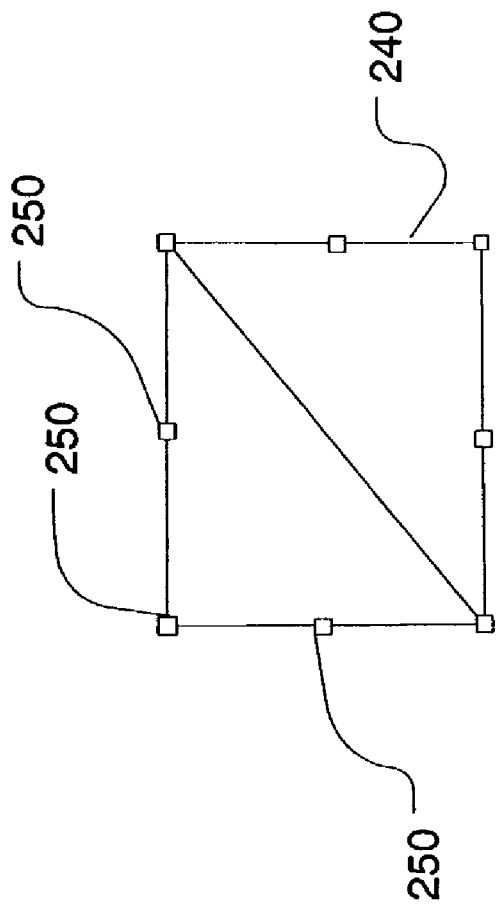
FIGS. 2a and 2b, which illustrate examples of selected lines and/or selection boxes in the prior art.
Figure 2A:
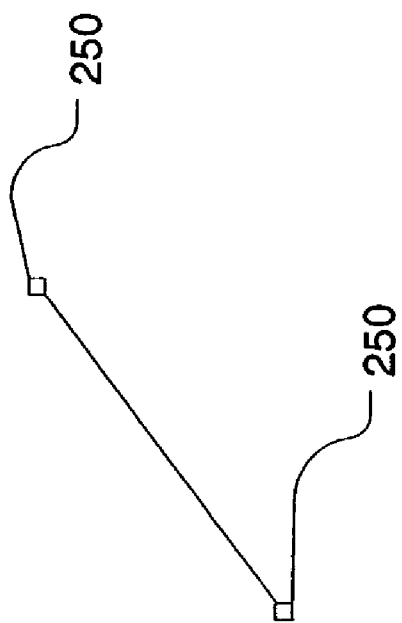

For example, the background may include a series of parallel horizontal (or vertical) lines to assist the user in keeping the handwritten text in line (particularly when the GUI is used to enter text), as exemplified in FIGS. 1a and 1b. The strokes or objects need not be constrained to such lines, however, and they may overlap 1, 2, 3 or more of them. The background may also include various other objects, such as text, images, drawings, handwriting, watermarks, etc.

The graphical object or stroke may become highlighted or selected in any number of ways. For example, in a pen-based computing device, the user may position the stylus over the displayed stroke or graphical object (e.g., by hovering) to select the object. The user may move a pointer over the graphical object or stroke to select it, and she may also press a button to select it. Any other known method for selecting a stroke or graphical object in a GUI will also suffice.

Figure 9:
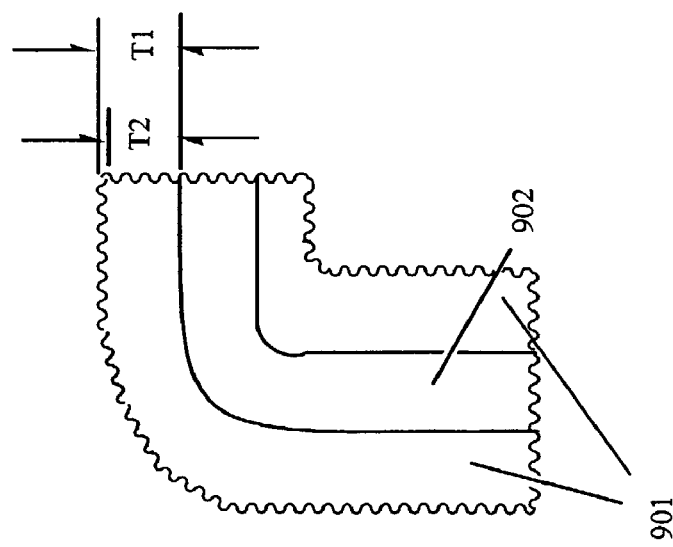
Figure 11:
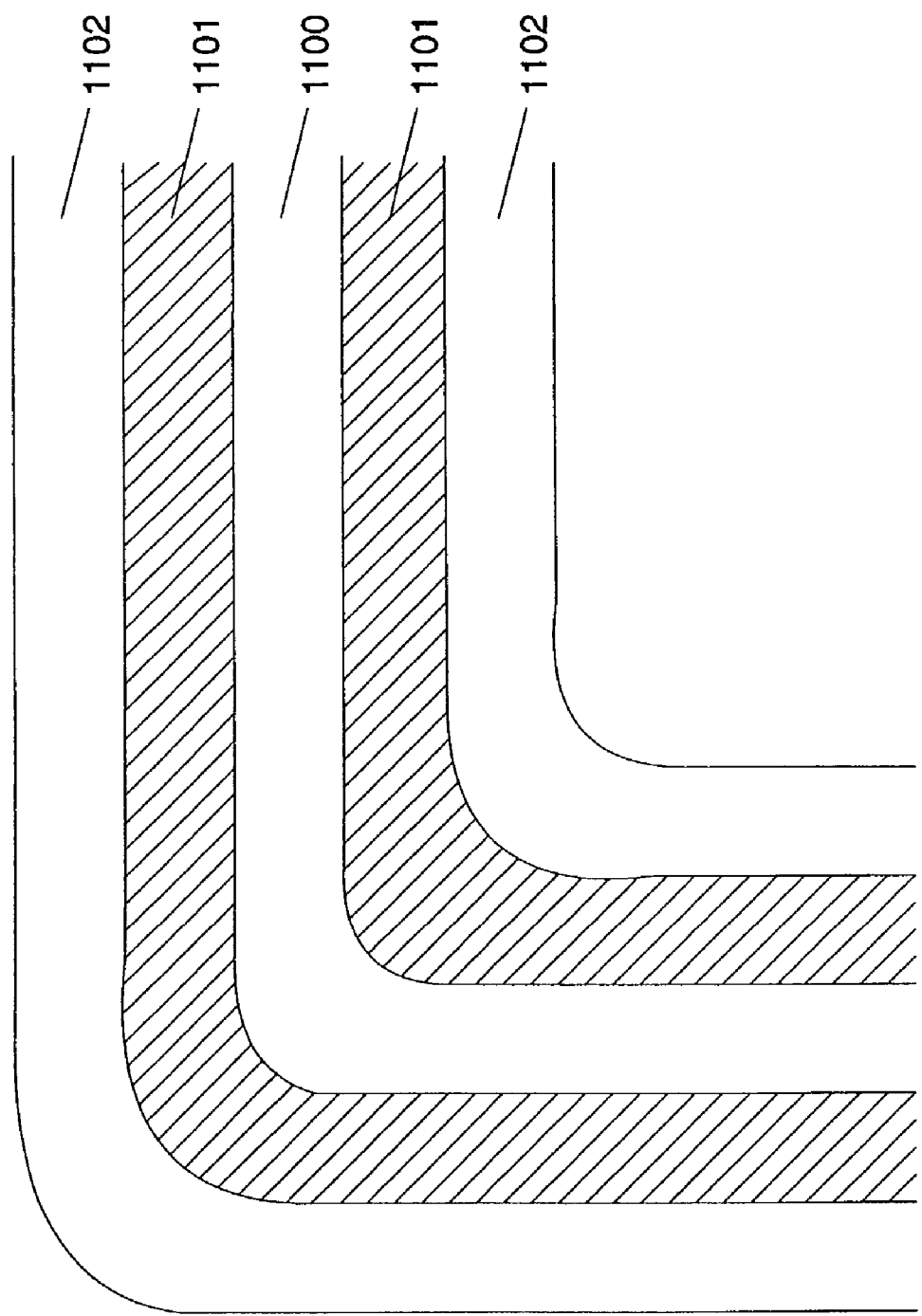

In additional alternative examples, the width of the highlighting ink layer may have a varying thickness to give the highlighted and/or selected object a more distinguished appearance. For example, as shown in FIG. 9, the thickness of the highlighting 901 on the regular ink color 902 may vary to give the highlighted graphical object a glowing appearance. The variation may be regular and periodic between two or more thicknesses (T1 and T2) (e.g., varying between 10 and 15 pixels every linear inch), or alternatively, may randomly vary among two or more thicknesses.

As shown in FIG. 10, the highlighting ink layer 1002 also may vary its color and/or pattern value across its thickness. For example, the highlighting color and/or pattern 1002 may be darker near the outer edges of the graphical object or stroke being highlighted 1001, and become lighter near the outer edges of the highlighting 1002. At the outer edges of highlighting 1002, the color/pattern may be a lighter version of the same color (e.g., light green becoming green becoming dark green, light gray becoming dark gray becoming black, etc.), or of the same pattern (e.g., less concentrated stripes and/or shading becoming progressively more concentrated, etc.). This variation in the highlighting color and/or pattern may help give the highlighted graphical object more of a glowing appearance. Other variations may also be used. For example, the color and/or pattern may become darker toward the outer edge of the highlighting, or may vary in darkness throughout.

As another possible variation, it is not necessary that the various highlight colored stroke(s) and/or ink colored stroke(s) be rendered to overlay the other, wider strokes. Rather, the various strokes may be rendered in any suitable manner without departing from the invention. For example, the innermost stroke could be rendered first, with the wider strokes rendered later in a manner such that the wider strokes at least partially or completely surround the inner strokes.

V. CONCLUSION

Various examples of the present invention have been described above, and it will be understood by those of ordinary skill that the present invention includes within its scope all combinations and subcombinations of these examples. Additionally, those skilled in the art will recognize that the above examples simply exemplify the invention. Various changes and modifications may be made without departing from the spirit and scope of the invention, as defined in the appended claims.

The invention claimed is:

1. A computer readable medium having a data structure stored thereon for storing electronic ink, the data structure comprising:
  a first set of data points defining a first electronic ink stroke, wherein the first set of data points includes first highlight attribute information, the first highlight attribute information comprises a highlight indicator that, upon being set, causes a first highlight stroke that is different from the first electronic ink stroke and rendered separately from the first electronic ink stroke to be generated and associated with the first electronic ink stroke; and
  a second set of data points defining a second electronic ink stroke, wherein the second set of data points includes second highlight attribute information, the second highlight attribute information comprises a highlight indicator that, upon being set, causes a second highlight stroke that is different from the second electronic ink stroke and rendered separately from the second electronic ink stroke to be generated and associated with the second electronic ink stroke.

2. A computer readable medium according to claim 1, wherein the first data set representing the first electronic ink stroke represents a single ink stroke.

3. A computer readable medium according to claim 1, wherein the first data set representing the first electronic ink stroke represents an ink word including one or more ink strokes.

4. The computer readable medium of claim 1,
  wherein the first highlight attribute information includes data indicating a glow highlighting color or pattern, and
  wherein the second highlight attribute information includes data indicating a glow highlighting color or pattern.

5. A method for rendering electronic ink, comprising:
  receiving data representing at least one electronic ink stroke, wherein the data includes a set of data points corresponding to the at least one electronic ink stroke, and wherein the set of data points includes a highlight indicator specifying whether the at least one electronic ink stroke has highlighting activated such that the highlight indicator causes a first highlighting stroke, different from the at least one electronic ink stroke and to be rendered separately from the at least one electronic ink stroke, to be associated with the at least one electronic ink stroke if the highlight indicator specifies that the at least one electronic ink stroke has highlighting activated;
  rendering the first highlighting stroke in a first dimension and in a first highlighting color or pattern, wherein the first dimension and the first highlighting color or pattern is defined by the set of data points; and
  rendering an ink color stroke in an ink color or pattern and in a second dimension that is smaller than the first dimension;
  wherein the first highlighting stroke and the ink color stroke are rendered so as to produce a composite ink stroke that has a highlighted appearance.

6. A method according to claim 5, wherein the ink color stroke at least partially overlays the first highlighting stroke.

7. The method of claim 5, wherein the data representing the at least one electronic ink stroke further includes a word data set.

8. The method of claim 5, further comprising:
  identifying a first indication that the at least one electronic ink stroke has highlighting activated;
  upon identifying the indication, associating the first highlighting stroke with the at least one electronic ink stroke;
  identifying a second indication that the at least one electronic ink stroke is no longer to be highlighted; and
  upon identifying the second indication, removing the first highlighting stroke from association with the at least one electronic ink stroke.

9. A method for rendering electronic ink, comprising:
  receiving data representing at least one electronic ink stroke, the data including at least one set of data points corresponding to the at least one electronic ink stroke, and wherein the at least one set of data points includes a highlight indicator specifying whether the at least one electronic ink stroke has highlighting activated wherein a first highlighting stroke, different from the at least one electronic ink stroke and to be rendered separately from the at least one electronic ink stroke, is created and associated with the at least one electronic ink stroke if the highlight indicator specifies that the at least one electronic ink stroke has highlighting activated;
  rendering the first highlighting stroke in a first dimension and in a first highlighting color or pattern, wherein the first highlighting color or pattern is defined by the at least one set of data points;
  rendering an ink color stroke in an ink color or pattern and in a second dimension that is smaller than the first dimension;
  rendering a second highlighting stroke in a second highlighting color or pattern and in a third dimension that is smaller than the second dimension,
  wherein the first highlighting stroke, the second highlighting stroke, and the ink color stroke are rendered so as to produce a composite ink stroke that has a highlighted appearance.

10. A method according to claim 9, wherein the second highlighting color or pattern is the same as the first highlighting color or pattern.

11. A method according to claim 9, wherein the ink color stroke at least partially overlays the first highlighting stroke and the second highlighting stroke at least partially overlays the ink color stroke.

12. The method of claim 9, wherein the data representing the at least one electronic ink stroke further includes a word data set.

13. A computer-readable medium having computer-executable instructions for performing the steps comprising:
  storing data representing at least one electronic ink stroke, the data including at least one set of data points corresponding to the at least one electronic ink stroke and wherein the at least one set of data points includes a highlight indicator specifying whether the at least one electronic ink stroke has highlighting activated; and
  if the highlight indicator specifies that the at least one ink stroke has highlighting activated,
  rendering a first highlighting stroke representing the at least one electronic ink stroke in a first dimension and in a first highlighting color or pattern, wherein the first highlighting stroke is different from the at least one electronic ink stroke and is rendered separately from the at least one electronic ink stroke and the first highlighting color or pattern is defined by the at least one set of data points; and
  rendering an ink color stroke in an ink color or pattern and in a second dimension that is smaller than the first dimension;

wherein the first highlighting stroke and the ink color stroke are rendered so as to produce a composite ink stroke that has a highlighted appearance.

14. A computer-readable medium according to claim 13, wherein the ink color stroke at least partially overlays the first highlighting stroke.

15. A computer-readable medium having computer-readable instructions for performing the steps comprising:

storing a set of data points defining at least one electronic ink stroke, wherein the set of data points includes an attribute indicative of whether the at least one electronic ink stroke is to be highlighted, the attribute causes a first highlighting stroke that is different from the at least one electronic ink stroke to be rendered separately from the at least one electronic ink stroke upon the attribute indicating that the at least one ink stroke is to be highlighted and causes the first highlighting stroke to be removed upon the attributed indicating that the at least one ink stroke is no longer to be highlighted;

rendering the first highlighting stroke representing the at least one electronic ink stroke in a first dimension and in a first highlighting color or pattern, wherein the first highlighting stroke is rendered in a first layer;

rendering an ink color stroke in an ink color or pattern and in a second dimension that is smaller than the first dimension, wherein the ink color stroke is rendered in a second layer;

rendering a second highlighting stroke in a second highlighting color or pattern and in a third dimension that is smaller than the second dimension, wherein the second highlighting stroke is rendered in a third layer;

wherein the first highlighting stroke, the second highlighting stroke, and the ink color stroke are rendered so as to produce a composite ink stroke that has a highlighted appearance.

16. A computer-readable medium according to claim 15, wherein the second highlighting color or pattern is the same as the first highlighting color or pattern.

17. A computer-readable medium according to claim 15, wherein the ink color stroke and the second layer at least partially overlay the first highlighting stroke and the first layer and the second highlighting stroke and the third layer at least partially overlay the ink color stroke and the second layer.

18. The computer-readable medium of claim 15, wherein the first dimension, the first highlighting color or pattern, the second dimension, the ink color or pattern, the third dimension, and the second highlighting color or pattern are defined by the set of data points that define the at least one electronic ink stroke.

19. A system, comprising:

a storage device configured to store data representing at least one electronic ink stroke, wherein the data includes at least one set of data points corresponding to the at least one electronic ink stroke and wherein the at least one set of data points includes a highlight indicator specifying whether the at least one electronic ink stroke has highlighting activated, the highlight indicator associates a first highlighting stroke with the at least one electronic ink stroke upon an indication by the attribute that the at least one electronic ink stroke is to be highlighted, the first highlighting stroke is different from the at least one electronic ink stroke and is rendered separately from the at least one electronic ink stroke; and a processor adapted to:

render the first highlighting stroke representing the at least one electronic ink stroke in a first dimension and in a first highlighting color or pattern, wherein the first highlighting color or pattern is defined by the at least one set of data points; and render an ink color stroke in an ink color or pattern and in a second dimension that is smaller than the first dimension;

wherein the processor renders the first highlighting stroke and the ink color stroke so as to produce a composite ink stroke that has a highlighted appearance.

20. A system according to claim 19, wherein the processor renders the ink color stroke so as to at least partially overlay the first highlighting stroke.

21. A system, comprising:

a storage device constructed and adapted to store a set of data points representing at least one electronic ink stroke, wherein the set of data points includes an attribute indicative of whether the at least one electronic ink stroke is to be highlighted, the attribute associates a first highlighting stroke with the at least one electronic ink stroke upon an indication by the attribute that the at least one electronic ink stroke is to be highlighted, the first highlighting stroke is different from the at least one electronic ink stroke and is rendered separately from the at least one electronic ink stroke; and a processor adapted to:

render the first highlighting stroke representing the at least one electronic ink stroke in a first dimension and in a first highlighting color or pattern, wherein the first highlighting stroke is rendered in a first layer and wherein the first highlighting color or pattern is defined by the set of data points;

render an ink color stroke in an ink color or pattern and in a second dimension that is smaller than the first dimension, wherein the ink color stroke is rendered in a second layer; and render a second highlighting stroke in a second highlighting color or pattern and in a third dimension that is smaller than the second dimension, wherein the second highlighting stroke is rendered in a third layer, wherein the processor renders the first highlighting stroke, the second highlighting stroke, and the ink color stroke so as to produce a composite ink stroke that has a highlighted appearance.

22. A system according to claim 21, wherein the processor renders the second highlighting color or pattern the same as the first highlighting color or pattern.

23. A system according to claim 21, wherein the processor renders the ink color stroke so as to at least partially overlay the first highlighting stroke and the second highlighting stroke so as to at least partially overlay the ink color stroke.

24. A system, comprising:

a storage device configured to store data representing at least one electronic ink stroke, wherein the data includes at least one set of data points corresponding to the at least one electronic ink stroke and wherein the at least one set of data points includes a highlight indicators, the highlight indicator is triggered to specify that the at least one electronic ink stroke has highlighting activated and to cause a highlight stroke that is different from the at least one electronic ink stroke to be rendered separately from the at least one electronic ink stroke; and a processor adapted to:

render a highlighted ink stroke representing the at least one electronic ink stroke with the highlight stroke, wherein the highlighted ink stroke includes a first outer highlight color or pattern and a first inner ink color or pattern different from the first outer highlight color or pattern, wherein the first outer highlight color or pattern is defined by the at least one set of data points;

receive a selection of at least the highlighted ink stroke; and when selected, render the highlighted ink stroke with a second outer highlight color or pattern, a second inner ink color or pattern, and a first inner highlight color or pattern.

25. A system according to claim 24, wherein the processor is adapted to render the first outer highlight color or pattern the same as the second outer highlight color or pattern.

26. A system according to claim 24, wherein the processor is adapted to render the first inner ink color or pattern the same as the second inner ink color or pattern.

27. A system according to claim 24, wherein the processor is adapted to render the first inner highlight color or pattern the same as the second outer highlight color or pattern.

28. A system according to claim 24, wherein the processor is adapted to render the first inner ink color or pattern so as to at least partially overlay the first outer highlight color or pattern.

29. A system according to claim 24, wherein the processor is adapted to render the first inner highlight color or pattern so as to at least partially overlay the second inner ink color or pattern, and the second inner ink color or pattern so as to at least partially overlay the second outer highlight color or pattern.

* * * * *

UNITED STATES PATENT AND TRADEMARK OFFICE
CERTIFICATE OF CORRECTION

| | | |
|---|---|---|
| PATENT NO. | : 7,428,711 B2 | Page 1 of 1 |
| APPLICATION NO. | : 10/284378 | |
| DATED | : September 23, 2008 | |
| INVENTOR(S) | : Justin Garrett Tolmer et al. | |

It is certified that error appears in the above-identified patent and that said Letters Patent is hereby corrected as shown below:

In column 18, line 57, in Claim 24, delete "indicators," and insert -- indicator, --, therefor.

Signed and Sealed this
Twenty-third Day of August, 2011

David J. Kappos
*Director of the United States Patent and Trademark Office*